June 19, 1945. H. GRUENHAGEN 2,378,549
AUTOMATIC TRANSMISSION
Filed Jan. 17, 1944 2 Sheets-Sheet 1
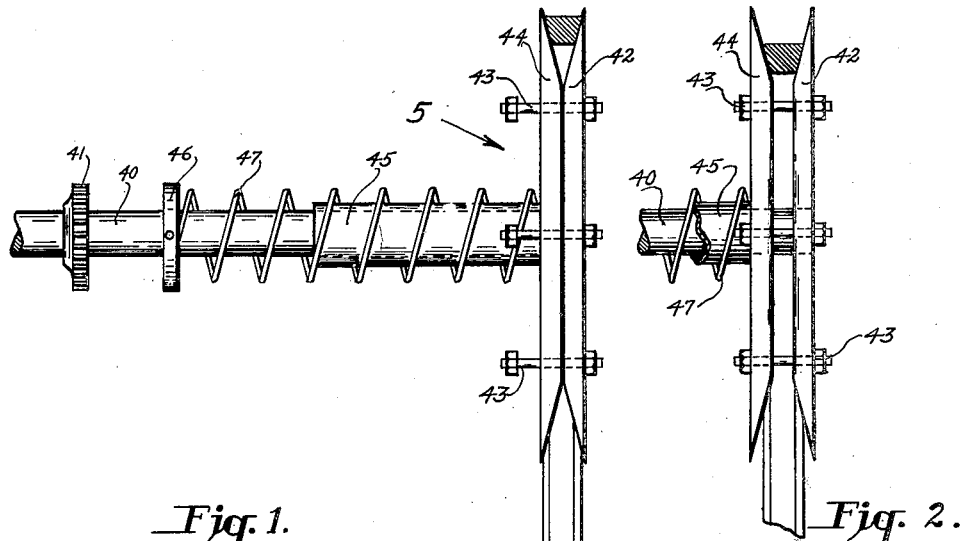
Fig. 1.
Fig. 2.
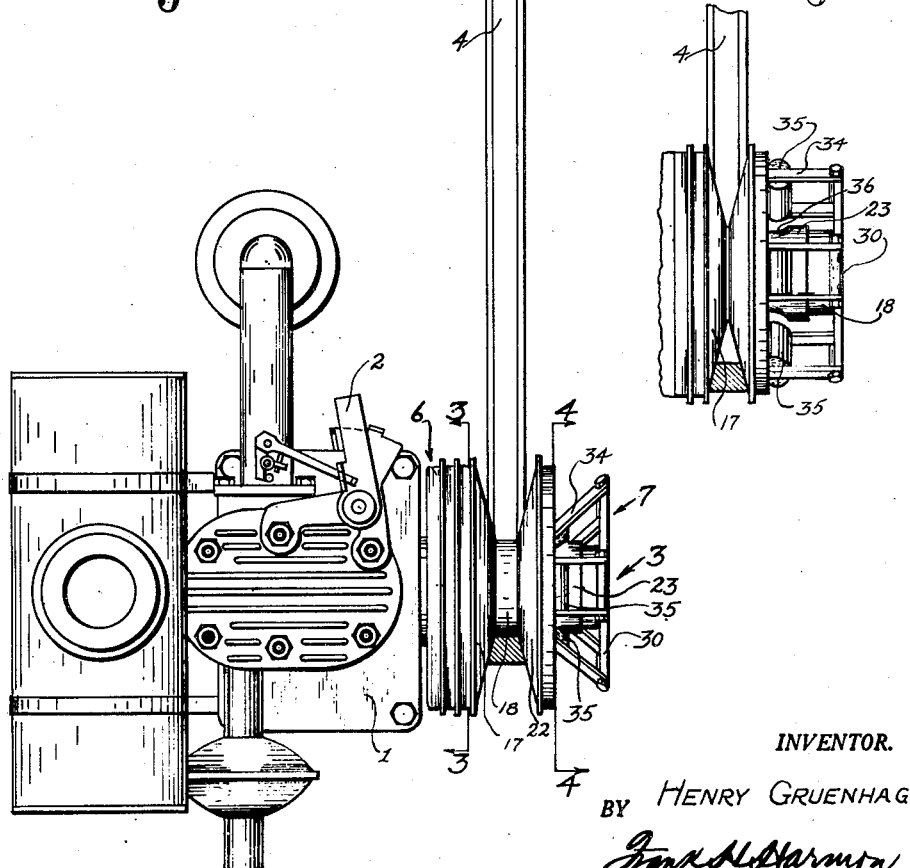
INVENTOR.
BY HENRY GRUENHAGEN
ATTORNEY June 19, 1945.                H. GRUENHAGEN                2,378,549
                              AUTOMATIC TRANSMISSION
                          Filed Jan. 17, 1944          2 Sheets-Sheet 2

INVENTOR.
BY HENRY GRUENHAGEN
  Frank H. Harmon
       ATTORNEY

Patented June 19, 1945

2,378,549

UNITED STATES PATENT OFFICE 2,378,549

AUTOMATIC TRANSMISSION

Henry Gruenhagen, Shaker Heights, Ohio, assignor, by mesne assignments, to Jack & Heintz, Inc., Cleveland, Ohio, a corporation of Ohio Application January 17, 1944, Serial No. 518,550

5 Claims. (Cl. 74—230.17)

This invention pertains to an automatic transmission and has as its general object to provide an improved clutch and variable ratio drive for an internal combustion engine which is entirely automatic in its operation.

A specific object is to provide a centrifugal clutch having associated therewith a belt and pulley drive whose driving ratio is automatically variable in response to speed, and a more detailed object is to provide a V belt drive through pulleys having centrifugal means for changing the effective diameters thereof automatically in accordance with the speed developed under different conditions.

With these and other objects in view, the invention resides in the combination of parts and in the construction and arrangement thereof hereinafter set forth in the following specification and appended claims, a preferred embodiment thereof being illustrated in the accompanying drawings, in which:

Figure 1 is a plan view of the present transmission with the parts in low speed positions:

Figure 2 is a fragmentary view taken as Figure 1, but showing the parts in high speed positions:

Figure 3:
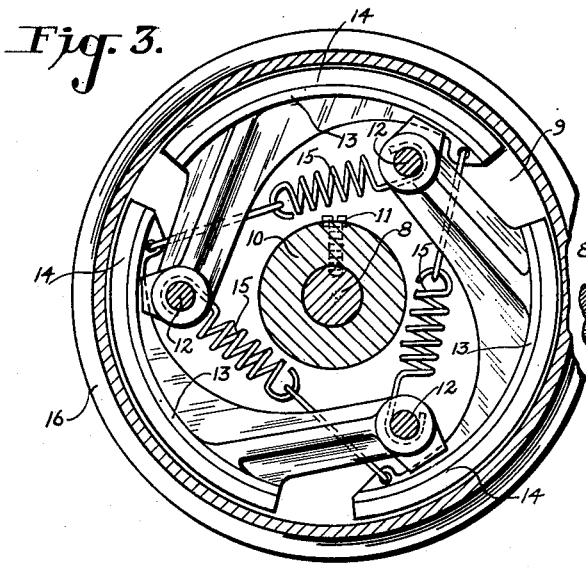
Figure 3 is an enlarged cross sectional view of the clutch mechanism, taken on the line 3—3 of Figure 1.

Referring more particularly to the drawings, in Figure 1 the invention is applied to an internal combustion engine 1 having a throttle lever 2 which, in the illustration, is set in idling position. The transmission comprises generally a drive unit 3 on the engine belted through a belt 4 to a driven unit 5. The drive unit 3 comprises an automatic clutch 6 and a drive unit speed controlling mechanism 7, these parts being carried on the engine crankshaft 8.

The details of the automatic clutch are best shown in Figure 3 wherein the operating parts are mounted upon a rear plate 9 carried by a hub 10 secured to the crankshaft 8 in some suitable manner such as by means of the set screw 11. A plurality of posts 12 on rear plate 9 pivotally carry centrifugally responsive clutch elements 13 resembling brake shoes provided with friction surfaces 14. Springs 15 normally retract the elements 13 radially inwardly until the rotational speed is sufficient to move them outwardly against the spring force to frictionally engage a surrounding drum 16. The relationship is such that at idling speeds of the engine the drum 16 is disconnected from the crankshaft 8 while at operating speeds of the engine the shoes 13 are pressed firmly against the drum 16 to establish a rigid driving connection therebetween, the action being entirely automatic in response to the speed of the crankshaft 8. The inner end of the drum 16 is open so as to surround the plate 9 and enclose it and the mechanism supported thereon, and the outer end is shaped to form a pulley half 17. The drum 16 also carries an axial extension or hub 18 by which it is supported upon needle bearings or the like 19 riding on a sleeve 20 secured to the crankshaft 8 by means of a screw 21.

Opposite the pulley half 17 is a pulley half 22 carried by a hub 23 rotatable with the hub 18 but axially movable therealong. In the present embodiment, the means slidably keying the hub 23 to the hub 18 comprises three grooves 24 of limited extent in the hub 18, three complementary grooves 25 extending the length of the hub 23 and a plurality of balls 26 contained within the grooves and supporting the hub 23 thereon. This construction provides for axial movement of the pulley half 22 with very little friction regardless of the torque being transmitted.

Figure 5:
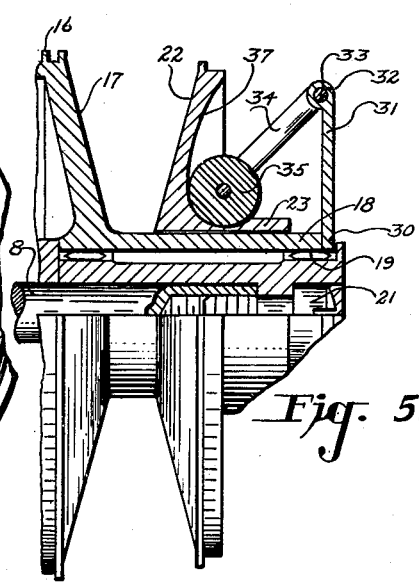
Figure 5 is a view of the driving unit, in partial section, showing the parts in positions for low speed, as in Figure 1.
Figure 4:
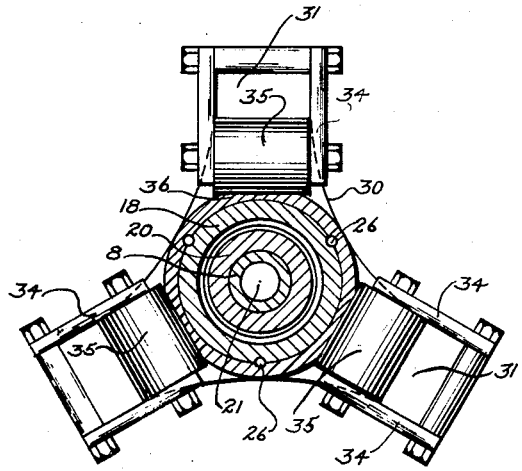
Figure 4 is an enlarged cross sectional view of the driving unit taken approximately on the line 4—4 of Figure 1.

The outer end of the hub 18 carries a spider plate 30 having three lobes 31, which plate is to be considered as integral with the hub 18. The end of each lobe 31 is formed into an eye 32 carrying a pin 33 to which is pivotally connected a pair of links 34 carrying a roller 35. Thus there are three of these rollers 35 loosely pivoted on the plate 30 so as to revolve therewith about the axis of the crankshaft with the drum 16. The rollers 35 normally occupy radially inward positions in recesses 36 as shown in Figures 1, 4 and 5, but under the influence of centrifugal force, the rollers 35 tend to swing radially outward from the crankshaft, rolling along a dished surface 37 on the rear side of the pulley half 22, such movement of the rollers 35 forcing the pulley half 22 to the left from the position shown in Figure 5 to the position shown in Figure 6.

The driven unit 5 constitutes the power take-off and comprises the shaft 40 mounted in suitable bearings, not shown, and having a sprocket or other gear or pulley 41 for delivering useful power, the shaft 40 being in the nature of a so-called jack shaft. Mounted rigidly on the shaft 40 is a pulley half 42 carrying a plurality of guides 43 for causing an axially movable pulley half 44 to rotate therewith. The pulley half 44 is carried by an elongated hub or sleeve 45, closely surrounding the shaft 40. A collar 46 fixed on the shaft 40 serves as a stationary abutment for a spring 47 surrounding both the shaft 40 and the sleeve 45 and constantly urging the pulley half 44 to the right under considerable force.

The spring 47 thus constitutes a resilient force against which the centrifugally responsive rollers 35 operate so that when the drive unit 3 is stationary, or is operating at low speeds, the spring 47 squeezes the pulley half 44 against the pulley half 42, causing the belt 4 to ride high in the groove as shown in Figure 1. The belt 4 has no stretch and consequently the result of the spring action in raising the belt to an outer diameter of the pulley 42—44 forces the pulley half 22 on the drive unit to the right, allowing the belt to move in to the hub 18 for a low speed drive. Thus Figure 1 shows the parts in the positions normally assumed when the whole system is at rest, when the motor is idling and the drive unit 3 is at rest with the clutch 6 in neutral, or when the clutch 6 is engaged and the drive unit 3 is operating at low speed.

Figure 6:
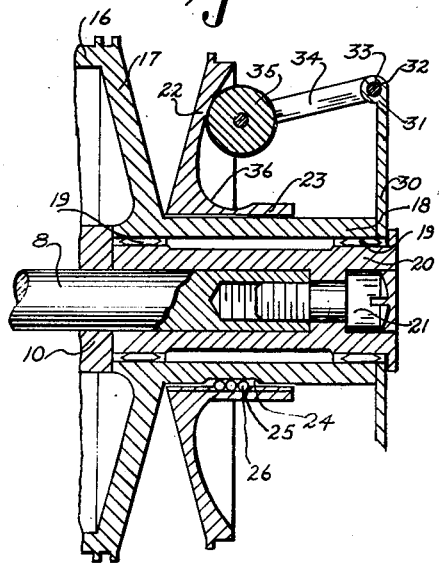
Figure 6 is a sectional view of the driving unit showing the parts in high speed positions, as in Figure 2.

When the speed of the drive unit 3 increases, the three rollers 35 acting as centrifugal weights tend to swing outwardly under action of centrifugal force and in so doing gradually move the pulley half 22 to the left so as to move the belt 4 out from the hub 18. This movement requires the belt to move inwardly between the pulley halves 42 and 44, separating them by moving the pulley half 44 to the left against the force of spring 47. At intermediate speeds, the belt will assume positions of equilibrium where the rollers 35 have swung out sufficiently to assume positions where they exert a force balancing the force of spring 47. Upon further increase in speed, the rollers 35 will move out to extreme positions as shown in Figures 2 and 6, causing the belt to ride in the extreme outer part of the pulley 17—22 and in the inner part of pulley 42—44 as shown in Figures 2 and 6.

Thus it will be appreciated that the present transmission is variable in ratio and entirely automatic in the changing of the ratio in response to speed, without the manipulation of clutch or gear shift levers or attention of an operator. The whole sequence of steps normally attending the operation of an internal combustion engine, requiring the manipulation of a throttle lever, clutch lever and gear shift lever, are thereby effected with a single throttle lever control. The motor may be started and run at idling speeds with the transmission in neutral where it will remain until the throttle is opened sufficiently to produce an operating speed. Upon opening of the throttle, the clutch gradually starts the rotatin of the drive unit 3 with the parts automatically maintaining themselves in low speed positions until the engine has assumed the load and accelerated sufficiently to warrant a higher speed ratio drive. The changing of the speed ratio then occurs gradually in stepless increments until the highest driving ratio is attained, which ratio will be maintained as long as the motor is able to carry the load at that speed. If the speed is reduced by reason of increasing load or closing of the throttle, the driving ratio will change smoothly and automatically to low speed so that the engine will not stall. If, for instance, the throttle lever is returned to idling position while under load, the transmission will merely drop back to its low speed position and the clutch will disengage to allow the motor to idle. Similarly, if an abnormal load is placed on the engine with the throttle opened to running position, the speed ratio will first change to low speed and then, if the engine is still unable to carry the load, it will slow down until it approaches idling speed whereupon the clutch will slip sufficiently to prevent the motor from stalling.

In this manner the present transmission automatically responds to throttle setting and load conditions just as though a skilled operator were manipulating a manual clutch and gear shifting transmission to get the best performance from the engine. In other words, the automatic response of the transmission supplies the judgment and operating skill heretofore required of a gas engine operator, so that such an engine may be readily operated by inexperienced persons.

Various changes may be made in the construction and arrangement of parts, and all such modifications are included in the invention, the same being limited only by the scope of the appended claims.

I claim:

1. In a power delivery system, a drive shaft, a centrifugal clutch driven element adapted to be driven by said drive shaft, said driven element having a portion forming a pulley half and an elongated hub portion mounted for free rotation on said shaft, an axially movable pulley half carried by said hub and constrained to rotate therewith, a cam surface on said movable pulley half, and centrifugal flyweights pivotally carried by said hub and adapted to bear against said cam surface to move said pulley half against the pulley half on said driven element to vary the effective diameter of the pulley constituted by said two pulley halves, said drive shaft being capable of idling rotation within the above described pulley structure.

2. An automatic transmission unit comprising a drive shaft, a centrifugal clutch having an internal driving member secured on said drive shaft and an external driven member rotatably mounted on said drive shaft, said driven member forming one side of an adjustable V-belt pulley, the other side of said pulley being mounted on said driven member in non-rotative relation therewith but capable of axial movement thereon, and a plurality of centrifugal weights carried by said driven member and adapted to bear directly against said axially movable pulley side so as to vary the effective diameter of said pulley in accordance with the speed of said driven member, said drive shaft being capable of rotation at idling speeds within said assembly without producing rotation thereof.

3. An automatic transmission unit comprising a drive shaft, a centrifugal clutch having an internal driving member secured to said shaft and an external driven member rotatably mounted on said shaft, said driven member forming one side of an adjustable V-belt pulley and including a hub portion bearing on said shaft, the other side of said pulley being mounted by ball and groove means on said hub so as to have free axial movement thereon while being constrained to rotate therewith, a spider carried by said hub, and a plurality of centrifugal weights pivotally carried by said spider and bearing directly against said axially movable pulley side to control the effective diameter of said pulley in accordance with the speed of said driven member, said drive shaft being freely rotatable within said assembly at idling speeds without producing rotation thereof.

4. An automatic transmission unit comprising a drive shaft, a hub mounted for rotation on said drive shaft, external longitudinal grooves on said hub, one side of a V-belt pulley integral with said hub, a second hub mounted on said first hub and carrying the other side of said pulley, internal grooves in said second hub complementary to said first mentioned grooves for receiving balls for mounting said second hub in non-rotative axially movable relation with said first hub, a spider plate on said first hub for pivotally mounting a plurality of centrifugal weights directed toward said movable pulley side, and cam surfaces on said movable pulley side, said centrifugal weights being formed as rollers adapted to roll directly on said cam surfaces to vary the effective diameter of said pulley in accordance with the rotational speed thereof, the above mentioned parts of said transmission unit being mounted for free rotation on said driving shaft and requiring additional clutch means in order to be connected therewith for power delivery.

5. An automatic transmission unit comprising a drive shaft, an elongated hub rotatably mounted on said drive shaft, a brake drum constituting the driven element of a centrifugal clutch integral with said hub, a side wall of said brake drum constituting one-half a V-belt pulley, a second pulley half mounted on a hub having axial non-rotative movement on said first hub, cam surfaces on the rear side of said second pulley half, and a plurality of centrifugal roller weights mounted on said first hub so as to roll on said cam surfaces to vary the effective diameter of said pulley in accordance with the speed of rotation of said brake drum whereby said drive shaft is capable of free rotation within the above unit until a driving connection is established therebetween.

HENRY GRUENHAGEN.